United States Patent
Ishikawa et al.

(10) Patent No.: US 8,475,337 B2
(45) Date of Patent: Jul. 2, 2013

(54) VEHICLE HEAT MANAGEMENT DEVICE

(75) Inventors: Masahide Ishikawa, Okazaki (JP); Kaname Uzuki, Toyota (JP); Atsushi Morita, Nagoya (JP); Keiko Tanaka, Toyota (JP); Yuki Miyamoto, Toyota (JP); Satoru Shiga, Toyota (JP); Masaki Morita, Toyota (JP); Miyuki Matsuda, Toyota (JP); Manabu Orihashi, Toyota (JP); Yoshihiro Saeki, Toyota (JP); Keiichi Uno, Kariya (JP); Hiroki Nishimura, Nagoya (JP); Takayuki Kumamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 22 days.

(21) Appl. No.: 13/258,252

(22) PCT Filed: May 7, 2009

(86) PCT No.: PCT/JP2009/058646
§ 371 (c)(1),
(2), (4) Date: Sep. 21, 2011

(87) PCT Pub. No.: WO2010/128547
PCT Pub. Date: Nov. 11, 2010

(65) Prior Publication Data
US 2012/0037336 A1    Feb. 16, 2012

(51) Int. Cl.
*F16H 59/00* (2006.01)
(52) U.S. Cl.
USPC .......................................................... 477/98
(58) Field of Classification Search
USPC .................................................. 477/98, 115
See application file for complete search history.

(56) References Cited

U.S. PATENT DOCUMENTS

| 2009/0011901 A1* | 1/2009 | DeMarco .......................... 477/98 |
| 2009/0036268 A1* | 2/2009 | Olson ............................... 477/98 |
| 2009/0118090 A1* | 5/2009 | Heap et al. ....................... 477/98 |
| 2010/0075802 A1* | 3/2010 | Gillanders et al. .............. 477/98 |

FOREIGN PATENT DOCUMENTS

| JP | A-08-200069 | 8/1996 |
| JP | A-2001-280135 | 10/2001 |
| JP | A-2003-269173 | 9/2003 |
| JP | A-2006-090382 | 4/2006 |
| JP | A-2007-198206 | 8/2007 |

OTHER PUBLICATIONS

International Search Report issued in Application No. PCT/JP2009/058646; Dated Aug. 18, 2009 (With Translation).
Dec. 12, 2011 Translation of International Preliminary Report on Patentability issued in International Application No. PCT/JP2009/058646.

* cited by examiner

*Primary Examiner* — Edwin A Young
(74) *Attorney, Agent, or Firm* — Oliff & Berridge, PLC

(57) ABSTRACT

When there is an extremely low ambient temperature, an electronic control unit controls operation of a circulation path for coolant water in such a manner that, after starting of an engine, the coolant water is supplied from the engine first to a throttle valve and an EGR valve and then to an oil warmer for a transmission. This solves a failure problem in the throttle valve and the EGR valve caused by frost formation at an early stage. As a result, desired operating performance of the vehicle is quickly ensured and heat management in the vehicle is carried out in a desired manner when there is an extremely low ambient temperature.

7 Claims, 4 Drawing Sheets

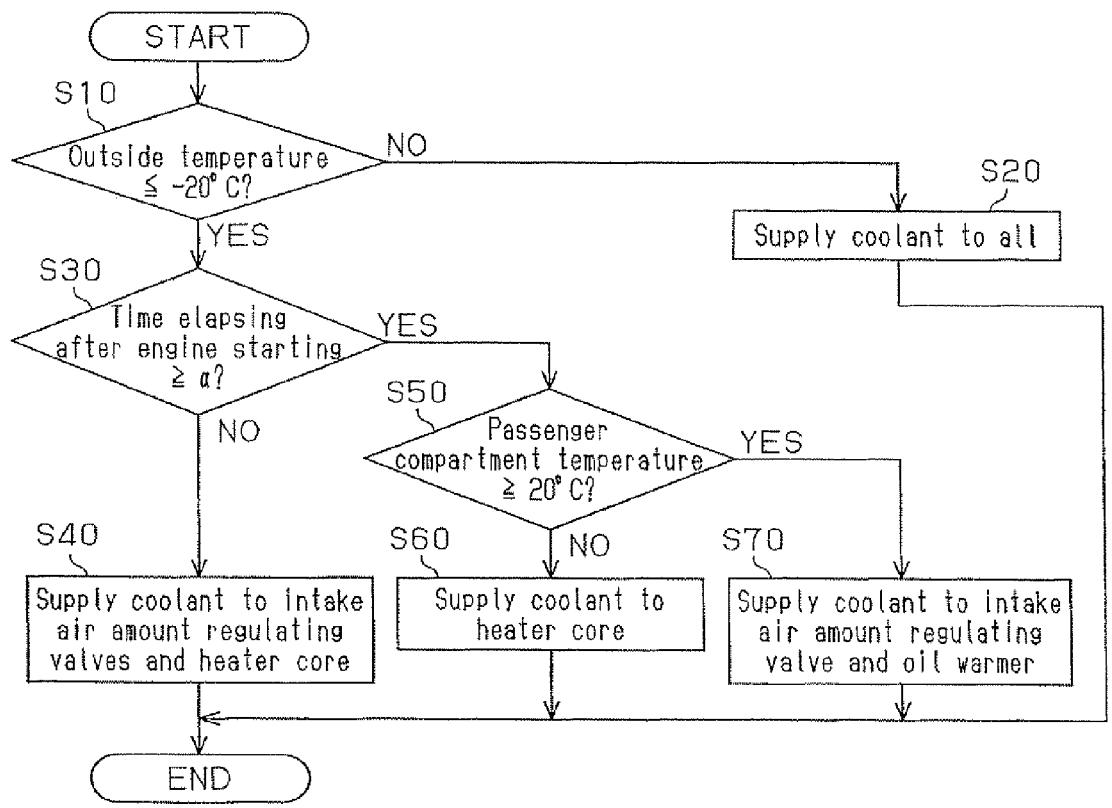
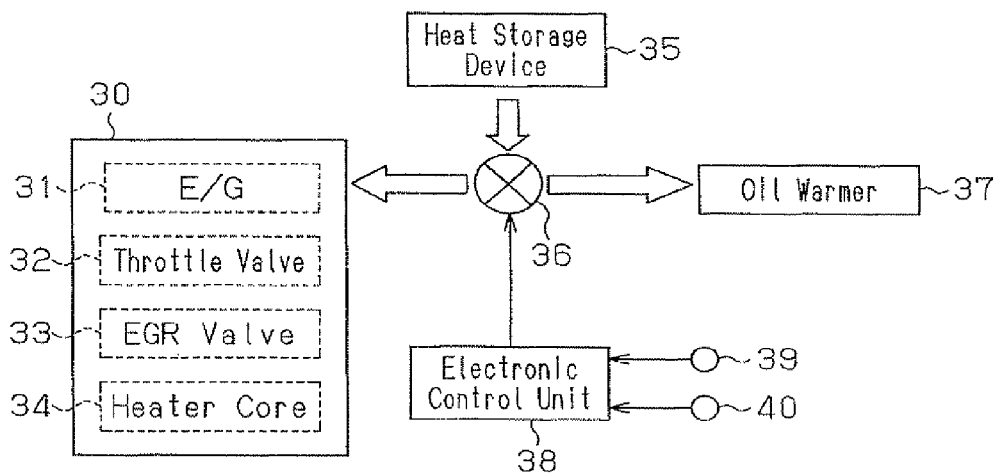

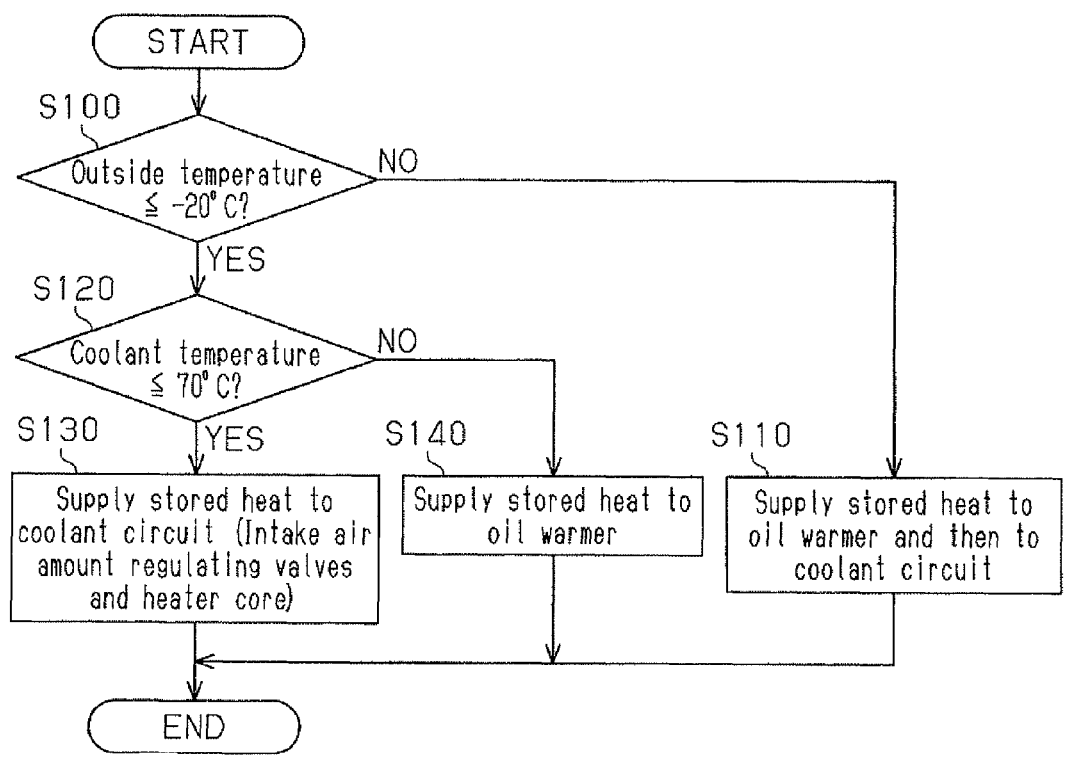

VEHICLE HEAT MANAGEMENT DEVICE

FIELD OF THE INVENTION

The present invention relates to a heat management device for a vehicle that controls heat supply from a heat source mounted in the vehicle to various components of the vehicle.

BACKGROUND OF THE INVENTION

To improve fuel economy performance and emission performance in a vehicle, precise heat management has been demanded in the vehicle as a whole. Conventionally, a device described in Patent Document 1 has been known as a heat management device for a vehicle. The heat management device activates various auxiliary heat sources in accordance with conditions for control of cooling of the power train or the battery and drive force and ensures air conditioning performance for the passenger compartment.

Passenger comfort and fuel economy performance of a vehicle are considerations for heat management performed by the conventional heat management device. However, heat management for a particular condition such as an extremely low ambient temperature has not been considered. In this regard, there is room for improvement in heat management devices.

Patent Document 1: Japanese Laid-Open Patent Publication No. 2001-280135

SUMMARY OF THE INVENTION

Accordingly, it is an objective of the present invention to provide a heat management device for a vehicle capable of reliably performing heat management in the vehicle when there is an extremely low ambient temperature.

To achieve the above objective, the present invention provides a heat management device for a vehicle including an engine and a transmission. The heat management device includes a heat source mounted in the vehicle, a valve warm-up portion that warms up an intake air amount regulating valve of the engine using heat supplied from the heat source, a transmission warm-up portion that warms up the transmission using the heat supplied from the heat source, and a heat management section that controls, after starting of the engine, heat supply from the heat source to supply the heat to the valve warm-up portion preferentially over the transmission warm-up portion.

At an extremely low ambient temperature, frost may form in intake air amount regulating valves of an engine, such as a throttle valve or an exhaust gas recirculation (EGR) valve, immediately after engine starting, thus causing operational failure of the valve. In this case, output of the engine cannot be regulated and thus operation of the vehicle is hampered. Contrastingly, when warm-up of the transmission is insufficient, although the viscosity of the hydraulic fluid in the transmission is increased and the fuel economy performance of the vehicle is lowered, the vehicle is allowed to operate without any problem.

Accordingly, in the present invention, heat produced by the heat source mounted in the vehicle is supplied first to the valve warm-up portion that warms up the intake air amount regulating valve and then to the transmission warm-up portion that warms up the transmission, after the engine is started. This rapidly defrosts the intake air amount regulating valve even when there is an extremely low ambient temperature, thus ensuring desired operating performance of the vehicle more quickly. As a result, according to the present invention, the heat management in the vehicle when there is an extremely low ambient temperature is performed in a desired manner.

If the vehicle includes a heater core for heating the passenger compartment as a component that receives heat from the heat source, it is desirable to configure the control section to control the heat supply from the heat source in such a manner as to supply heat to the heater core preferentially over the transmission warm-up portion. Specifically, when at an extremely low ambient temperature, frost may form in a window of the vehicle and thus deteriorate visibility for the driver, making it difficult to drive the vehicle. Such window frost formation may be stopped by blowing warm air from a heater onto the glass of the window. For this purpose, it is necessary to ensure desired heater performance. In this regard, by supplying heat to the heater core preferentially over the transmission warm-up portion, the desired heater performance is ensured at an earlier stage, and drivability of the vehicle is secured more quickly.

If the heater core for heating the passenger compartment is provided as a component that receives heat from the heat source, it is more desirable to configure the control section to control the heat supply from the heat source in such a manner that heat supply to the valve warm-up portion and the heater core, heat supply to the heater core, and heat supply to the valve warm-up portion and the transmission warm-up portion are performed sequentially in this order after starting of the engine. Specifically, in this case, heat is supplied first to the valve warm-up portion and the heater core after the engine is started, thus defrosting the intake air regulating valve or the window. This ensures drivability and desired operating performance of the vehicle. Subsequently, the heat supply to the heater core is carried out to heat the passenger compartment, thus ensuring comfort for the passengers. Finally, the heat is supplied to the valve warm-up portion and the transmission warm-up portion to ensure desired fuel economy performance of the vehicle. Through such heat supply to the components of the vehicle, heat management when there is an extremely low ambient temperature is performed in a desired manner.

It is preferred for the heat management device to start the heat supply to the transmission warm-up portion on condition that the portion that has received heat preferentially over the transmission warm-up portion, which are the intake air amount regulating valve or the heater device for the passenger compartment (or the passenger compartment), is completely warmed-up. In this manner, heat is supplied preferentially to the valve warm-up portion or the heater core until the intake air amount regulating valve and the window of the vehicle are defrosted. This ensures desired operating performance and drivability of the vehicle more quickly and reliably.

Frost forms in the intake air amount regulating valve only when there is an extremely low ambient temperature. It is thus preferred to configure the control section to control the heat supply from the heat source in such a manner that heat is supplied to the valve warm-up portion preferentially over the transmission warm-up portion when there is an extremely low ambient temperature and to the transmission warm-up portion preferentially over the valve warm-up portion when an extremely low ambient temperature is not present. In other words, it is desirable that preferential heat supply to the valve warm-up portion be performed only when there is an extremely low ambient temperature, which may form frost in the intake air amount regulating valve, and that preferential heat supply to the transmission warm-up portion be carried out when such a temperature is not present. This solves, in a desired manner, problems of decreased operating performance and hampered drivability caused in the vehicle by frost formation when there is an extremely low ambient temperature. Contrastingly, under normal conditions, heat management is carried out in a manner suitable for ensuring desired fuel economy performance of the vehicle.

Specifically, for the heat management device according to the present invention, an engine or a heat storage device, which collects exhaust heat from an engine and stores the heat after the engine is stopped, may be employed as the heat source mounted in the vehicle.

BRIEF DESCRIPTION OF THE DRAWINGS

FIG. 3 is a flowchart schematically representing the processing procedure of a heat supply path switching routine employed by the heat management device represented in FIG. 1;

FIG. 4 is a block diagram schematically representing the configuration of a heat management device for a vehicle according to a second embodiment of the invention as a whole; and FIG. 5 is a flowchart representing the processing procedure of a heat supply target switching routine employed by the heat management device represented in FIG. 4.

DETAILED DESCRIPTION OF THE PREFERRED EMBODIMENTS (First Embodiment)

Figure 1:
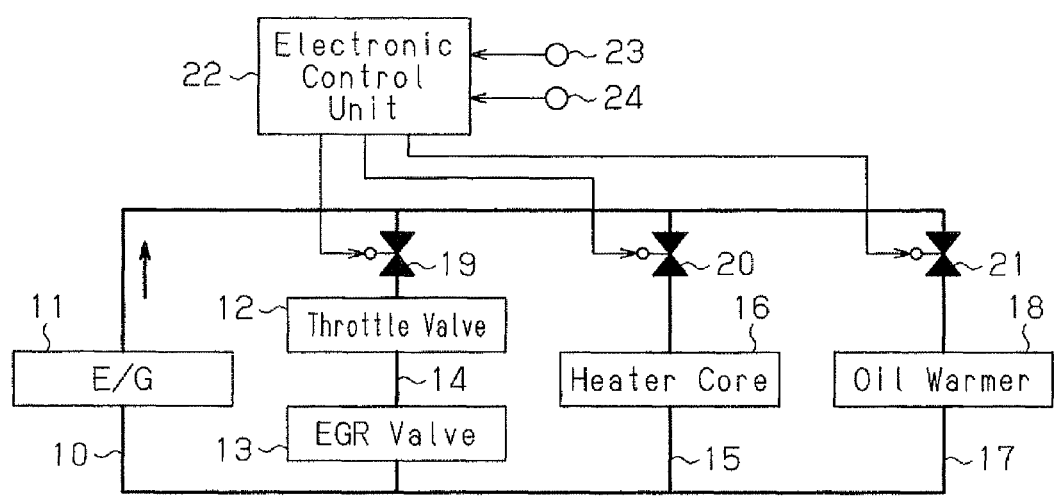
FIG. 1 is a block diagram schematically representing the configuration of a heat management device for a vehicle according to a first embodiment of the present invention as a whole.

A first embodiment of a heat management device for a vehicle according to the present invention will now be described with reference to FIGS. 1 to 3. The heat management device for a vehicle of the first embodiment controls heat supply from an engine using engine coolant water as heat transfer medium to components of the vehicle. In the first embodiment, the engine corresponds to the heat source mounted in the vehicle.

The configuration of the heat management device for a vehicle of the first embodiment will hereafter be described with reference to FIG. 1. The vehicle in which the first embodiment is employed includes a coolant circuit 10 for circulating coolant water after the coolant water is heated by an engine 11 serving as the heat source. The coolant circuit 10 is divided into three coolant paths, which are a valve coolant path 14, a heater coolant path 15, and a warmer coolant path 17, at positions downstream of the engine 11.

The valve coolant path 14 extends near a throttle valve 12 and an EGR valve 13, which are intake air amount regulating valves, and warms these valves (the valves 12 and 13) by means of the heat produced by the coolant water that has been heated by the engine 11. In the first embodiment, the valve coolant path 14 corresponds to the valve warm-up portion.

A heater core 16 for heating the passenger compartment is formed in the heater coolant path 15. The heater core 16, which is configured as a heat exchange device, heats the air directed into the passenger compartment by means of the heat produced by the coolant water that has been heated by the engine 11.

The warmer coolant path 17 includes an oil warmer 18 for heating hydraulic fluid (mission oil) in a transmission through the heat produced by the coolant water that has been heated by the engine 11. In the first embodiment, the oil warmer 18 corresponds to the transmission warm-up portion.

The paths 14, 15, and 17 include valves 19, 20, and 21, respectively. By selectively opening and closing the valves 19, 20, 21, the coolant water is permitted to flow or prohibited from flowing in the corresponding paths 14, 15, 17. After passing through the paths 14, 15, 17, the coolant water is returned to the engine 11.

Opening/closing of the valves 19, 20, 21 is controlled by an electronic control unit 22 serving as a heat management section. The electronic control unit 22 receives detection signals from an outside temperature sensor 23 for detecting the outside temperature of the vehicle and an inside temperature sensor 24 for detecting the inside temperature (the compartment temperature) in the passenger compartment. The electronic control unit 22 performs heat management in the vehicle by selectively opening and closing the valves 19, 20, 21 based on the detection results of these sensors (the sensors 23, 24).

The heat management in the vehicle carried out by the heat management device for a vehicle of the first embodiment will hereafter be described in detail. In the first embodiment, the heat supply from the engine using the coolant water as the medium is performed in the manner described below, when at an extremely low ambient temperature, or the outside temperature is lower than or equal to −20° C.

Figure 2A:
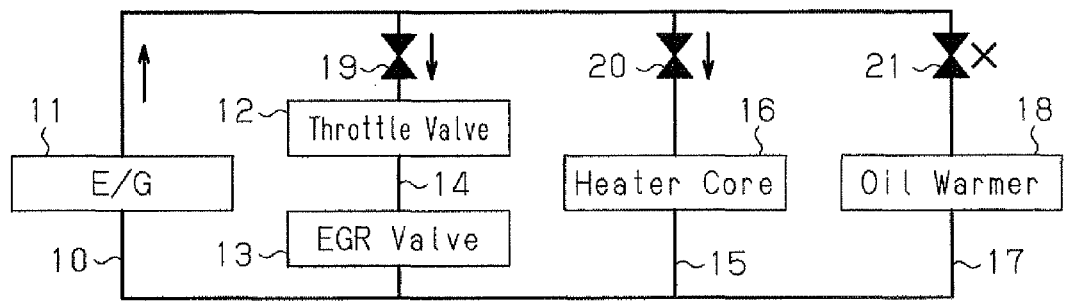
FIGS. 2(a), 2(b), and 2(c) are diagrams representing change of the coolant circulation mode after starting of the engine in the heat management device represented in FIG. 1.

As illustrated in FIG. 2(a), in a period immediately after the engine 11 is started, the electronic control unit 22 closes the valve 21 and opens the valves 19, 20 to allow the coolant water to flow in the valve coolant path 14 and the heater coolant path 15. That is, at this stage, the exhaust heat of the engine 11, which is the heat source, is supplied to the intake air amount regulating valves (the throttle valve 12 and the EGR valves 13) and the heater core 16. This defrosts the intake air amount regulating valves (the throttle valve 12 and the EGR valve 13) and ensures desired heater performance. Specifically, at this stage, the desired heater performance must be ensured to optimally operate a defroster for defrosting a vehicle window. Such heat supply to the intake air amount regulating valves and the heater core 16 is continued until it is estimated that the intake air amount regulating valves are completely defrosted.

Figure 2B:
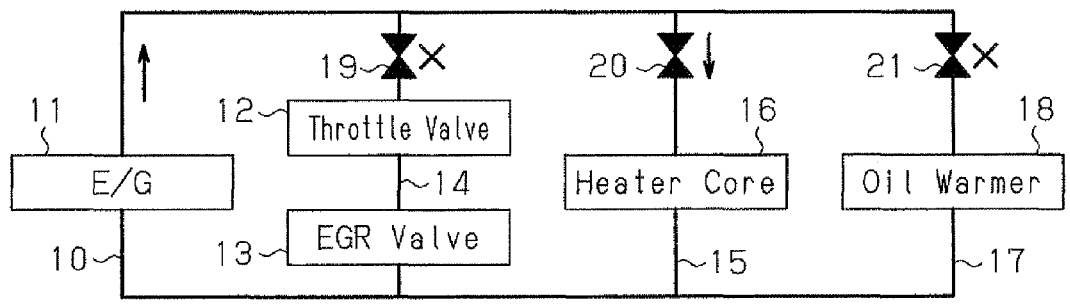

Subsequently, as illustrated in FIG. 2(b), the electronic control unit 22 closes the valves 19, 21 and opens the valve 20 to allow the coolant water to flow only in the heater coolant path 15. In other words, at this stage, the exhaust heat of the engine 11, which is the heat source, is supplied to the heater core 16. Specifically, at this stage, the heat must be supplied to the heater core 16 to heat the passenger compartment.

Figure 2C:
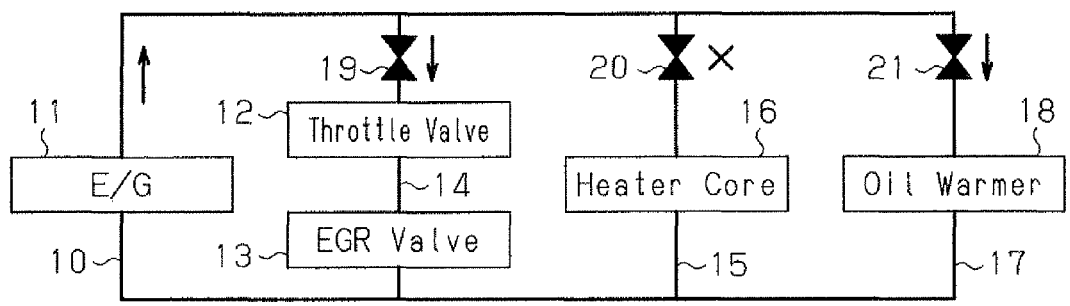

After the passenger compartment is sufficiently heated, the electronic control unit 22 closes the valve 20 and opens the valves 19, 21 to allow the coolant water to flow in the valve coolant path 14 and the warmer coolant path 17, as illustrated in FIG. 2(c). In other words, at this stage, the exhaust heat of the engine 11, which is the heat source, is supplied to the intake air amount regulating valves (the throttle valve 12 and the EGR valve 13) and the oil warmer 18. This promotes warm-up of the transmission (increases the temperature of the mission oil), thus ensuring desirable fuel economy performance. Further, by allowing the coolant water to flow in the proximity of the EGR valve 13 at this stage, the coolant water is heated by the heat produced by the exhaust gas returned to the intake air via the EGR valve 13. This promotes warm-up of the engine 11.

FIG. 3 is a flowchart representing a heat supply path switching routine employed in the first embodiment. Processing of the routine is performed by the electronic control unit 22 periodically and repeatedly when the engine 11 is in operation.

In the processing of the routine, the electronic control unit 22 first determines whether the outside temperature is lower than or equal to −20° C., or, in other words, where the vehicle is being subjected to an extremely low ambient temperature, in step S10. If the outside temperature is higher than −20° C. (S10: NO), the electronic control unit 22 performs step S20. In step S20, the electronic control unit 22 opens the valves 19, 20, and 21 to allow the coolant water to flow in each of the valve coolant path 14, the heater coolant path 15, and the warmer coolant path 17, and ends the current processing cycle of the routine.

In contrast, if the outside temperature is lower than or equal to −20° C. (S10: YES), the electronic control unit 22 carries out step S30. In step S30, the electronic control unit 22 determines whether the time elapsed after starting of the engine is greater than or equal to a specified value α in step S30. The specified value α is set as the time that is necessary and sufficient for defrosting the throttle valve 12 and the EGR valve 13, which have frost thereon, with the coolant water flowing in the valve coolant path 14. In other words, in step S30, it is determined whether defrosting of the throttle valve 12 and the EGR valve 13 is complete. If the time elapsed after starting of the engine is less than the specified value α (S30: NO), the electronic control unit 22 performs step S40. In step S40, the electronic control unit 22 controls the valves 19, 20, 21 to supply the coolant water to the intake air amount regulating valves (the throttle valve 12 and the EGR valve 13) and the heater core 16 and ends the current processing cycle of the routine. If the time that has elapsed after starting of the engine is greater than or equal to the specified value α (S30: YES), the electronic control unit 22 carries out step S50.

In step S50, the electronic control unit 22 determines whether the passenger compartment temperature is higher than or equal to 20° C., or, in other words, the passenger compartment has been effectively heated to ensure sufficient comfort in the passenger compartment. If the passenger compartment temperature is less than 20° C. (S50: NO), the electronic control unit 22 performs step S60. In step S60, the electronic control unit 22 controls the valves 19, 20, 21 to supply the coolant water only to the heater core 16 and ends the current processing cycle of the routine. If the passenger compartment temperature is higher than or equal to 20° C. (S50: YES), the electronic control unit 22 carries out step S70. In step S70, the electronic control unit 22 controls the valves 19, 20, 21 to supply the coolant water to the intake air amount regulating valves (the throttle valve 12 and the EGR valve 13) and the oil warmer 18, and ends the current processing cycle of the routine.

The first embodiment, which has been described, has the advantages described below.

(1) In the first embodiment, after the engine 11 is started, the electronic control unit 22 serving as the heat management section supplies heat from the engine 11 to the throttle valve 12 and the EGR valve 13, each serving as the intake air amount regulating valve, preferentially over the oil warmer 18 serving as the transmission warm-up portion. In other words, in the first embodiment, after starting of the engine, the heat supply from the engine 11 through the coolant water as the heat transfer medium is performed first on the valve coolant path 14, which is the valve warm-up portion, and then on the oil warmer 18, which is the transmission warm-up portion. Accordingly, the intake air amount regulating valves (the throttle valve 12 and the EGR valve 13) are defrosted at an early stage even when at an extremely low ambient temperature and desired operating performance of the vehicle is ensured quickly. As a result, in the first embodiment, the heat management in the vehicle is performed in a desired manner when at an extremely low ambient temperature.

(2) In the first embodiment, after starting of the engine, the electronic control unit 22 supplies heat to the heater core 16 for heating the passenger compartment preferentially over the oil warmer 18, which is the transmission warm-up portion. As a result, desired heater performance is ensured and the defroster is actuated to defrost the vehicle window at an earlier stage. This ensures drivability of the vehicle more quickly.

(3) In the first embodiment, after the engine is started, the electronic control unit 22 performs the heat supply to the valve coolant path 14 serving as the valve warm-up portion and the heater core 16, the heat supply to the heater core 16, and the heat supply to the valve coolant path 14 and the oil warmer 18 serving as the transmission warm-up portion sequentially in this order. Specifically, after starting of the engine 11, heat is supplied first to the valve coolant path 14 and the heater core 16 to defrost the intake air amount regulating valves (the throttle valve 12 and the EGR valve 13) and the vehicle window. This ensures drivability and desired operating performance for the vehicle. Subsequently, the heat is supplied to the heater core 16 to effectively heat the passenger compartment, thus ensuring passenger comfort. Finally, the heat is supplied to the valve coolant path 14 and the oil warmer 18 to ensure desired fuel economy performance of the vehicle. In this manner, desired heat management for when at an extremely low ambient temperature is carried out.

(4) In the first embodiment, the electronic control unit 22 starts the heat supply to the oil warmer 18, which is the transmission warm-up portion, on condition that warm-up (defrosting) of the throttle valve 12 and the EGR valve 13, which are the intake air amount regulating valves, and heating of the passenger compartment are complete. As a result, the heat supply to the valve coolant path 14 and the heater core 16 is performed preferentially until the intake air amount regulating valves and the vehicle window are defrosted. This ensures desired operating performance and drivability of the vehicle more quickly and reliably.

The first embodiment may be modified as follows.

In the first embodiment, it is estimated that defrosting of the intake air amount regulating valves (the throttle valve 12 and the EGR valve 13) is complete depending on the time that has elapsed after starting of the engine. However, such estimation may be carried out using another parameter such as the temperature of the coolant water.

In the first embodiment, after the engine 11 is started, the heat supply to the valve coolant path 14 serving as the valve warm-up portion and the heater core 16, the heat supply to the heater core 16, and the heat supply to the valve coolant path 14 and the oil warmer 18 serving as the transmission warm-up portion are carried out sequentially in this order. However, the heat supply to the heater core 16 may be performed according to an order different from the order of the embodiment as necessary. Also in this case, the advantages (1) and (2) are ensured by performing the heat supply to the heater core 16 preferentially over the heat supply to the oil warmer 18. Specifically, as long as the heat supply to the valve coolant path 14 is carried out preferentially over the heat supply to the oil warmer 18, the advantage (1) can be obtained.

(Second Embodiment)

A second embodiment of the heat management device for a vehicle according to the present invention will hereafter be described with reference to FIGS. 4 and 5, mainly on the differences between the second embodiment and the first embodiment.

With reference to FIG. 4, the configuration of the heat management device for a vehicle of the second embodiment will be described. The vehicle in which the second embodiment is employed includes a coolant circuit 30 in which coolant water flows. The coolant circuit 30 extends through an engine 31, a throttle valve 32 and an EGR valve 33 both serving as an intake air amount regulating valve, and a heater core 34 for heating the passenger compartment. As a result, by supplying heat to the coolant circuit 30, the heat is supplied to the throttle valve 32 and the EGR valve 33, which are the intake air amount regulating valves. In the second embodiment, the coolant circuit 30 corresponds to the valve warm-up portion.

The vehicle also includes a heat storage device 35 serving as the heat source. The heat storage device 35 recovers exhaust heat of the engine 31 and stores the heat after the engine 31 stops. The target to which the heat stored by the heat storage device 35 is supplied is switched, by means of a switch valve 36, between the coolant circuit 30 and an oil warmer 37 serving as the transmission warm-up portion.

The switch valve 36 is controlled by an electronic control unit 38 serving as the heat management section. The electronic control unit 38 receives detection signals from an outside temperature sensor 39 for detecting the outside temperature and a coolant temperature sensor 40 for detecting the temperature of the coolant water in the engine 31.

The heat management in the vehicle performed by the heat management device for a vehicle of the second embodiment will hereafter be described in detail. In the second embodiment, when at an extremely low ambient temperature, the electronic control unit 38 supplies the stored heat from the heat storage device 35 in an order different from the order at the time when not at an extremely low ambient temperature. Specifically, when at an extremely low ambient temperature, the electronic control unit 38 supplies the heat from the heat storage device 35 to the coolant circuit 30 and then to the oil warmer 37. When not at an extremely low ambient temperature, the electronic control unit 38 supplies the heat from the heat storage device 35 to the oil warmer 37 and then to the coolant circuit 30. The orders are different for the reason described below.

Specifically, by supplying heat to the oil warmer 37 to warm up the transmission, the viscosity of the mission oil is decreased and the sliding resistance of the transmission components is lowered. This improves the fuel economy performance of the vehicle. Accordingly, in a normal condition, the heat from the heat storage device 35 is supplied first to the oil warmer 37 to ensure desired fuel economy performance in the vehicle.

Contrastingly, when at an extremely low ambient temperature, frost may form in the throttle valve 32 or the EGR valve 33 or a vehicle window in a period immediately after the engine 31 is started. The frost may hamper the output adjustment of the engine 31 or decrease visibility of the driver. Accordingly, when at an extremely low ambient temperature, the heat from the heat storage device 35 is supplied first to the coolant circuit 30 to heat the coolant water. The heat is thus supplied to the throttle valve 32 and the EGR valve 33 to defrost the valves and to the heater core 34 to effectuate heating, thus actuating the defroster to defrost the vehicle window. After the valves and the vehicle window are defrosted, the heat is supplied to the oil warmer 37 to ensure the desired fuel economy performance.

FIG. 5 is a flowchart representing a heat supply target switching routine used to switch the heat supply targets for the heat storage device 35 in the second embodiment. Processing of the routine is performed by the electronic control unit 38 periodically and repeatedly when the engine 31 is operating.

In the processing of the routine, the electronic control unit 38 determines whether the outside temperature is lower than or equal to −20° C., or, in other words, the current ambient temperature is extremely low, in step S10. If the outside temperature is higher than −20° C. (S10: NO), the electronic control unit 38 performs step S110. In step S110, the electronic control unit 38 supplies the stored heat from the heat storage device 35 to the oil warmer 37 and then to the coolant circuit 30 and then ends the current processing cycle of the routine.

In contrast, if the outside temperature is lower than or equal to −20° C. (S100: YES), the electronic control unit 38 carries out step S120. In step S120, the electronic control unit 38 determines whether the temperature of the coolant water (the coolant temperature) is lower than or equal to 70° C., or, in other words, warm-up of the engine 31 is incomplete. If the warm-up is incomplete (S120: YES), the electronic control unit 38 performs step S130. In step S130, the electronic control unit 38 supplies the stored heat from the heat storage device 35 to the coolant circuit 30, or, in other words, the throttle valve 32, the EGR valve 33, and the heater core 34, and then ends the current processing cycle of the routine. In contrast, if the warm-up is complete (S120: NO), the electronic control unit 38 performs step S140. In step S140, the electronic control unit 38 supplies the stored heat from the heat storage device 35 to the oil warmer 37 and then ends the current processing cycle of the routine.

The heat management device for a vehicle of the second embodiment has the advantages described below.

(5) In the second embodiment, after the engine is started when there is an extremely low ambient temperature, the stored heat is supplied from the heat storage device 35, which is the heat source, first to the coolant circuit 30 serving as the valve warm-up portion and then to the oil warmer 37 serving as the transmission warm-up portion. Accordingly, even when at an extremely low ambient temperature, the intake air amount regulating valves are defrosted at an early stage and desired operating performance of the vehicle is ensured more quickly. As a result, heat management in the vehicle is carried out in a desired manner when there is an extremely low ambient temperature.

(6) In the second embodiment, after the engine is started when there is an extremely low ambient temperature, the stored heat is supplied from the heat storage device 35 to the heater core 34 preferentially over the oil warmer 37 serving as the transmission warm-up portion. As a result, heater performance is ensured at an earlier stage and the vehicle windshield is defrosted quickly.

(7) In the second embodiment, after the engine is started when there is an extremely low ambient temperature, the heat is supplied from the heat storage device 35 to the oil warmer 37 serving as the transmission warm-up potion on condition that the warm-up of the engine 31 through the heat supply from the heat storage device 35 to the coolant circuit 30 is complete. Accordingly, preferential heat supply to the intake air amount regulating valves (the throttle valve 32 and the EGR valve 33) and the heater core 34 is continued until the intake air amount regulating valves and the vehicle windshield are defrosted. This ensures desired operating performance and drivability of the vehicle more quickly and reliably.

(8) In the second embodiment, the electronic control unit 38 supplies heat to the coolant circuit 30 serving as the valve warm-up portion preferentially over the oil warmer 37 serving as the transmission warm-up portion when there is an extremely low ambient temperature. When there is not an extremely low ambient temperature, the electronic control unit 38 controls the heat supply from the heat storage device 35, which is the heat source, in such a manner as to supply heat to the oil warmer 37 preferentially over the coolant circuit 30. In other words, preferential heat supply to the coolant circuit 30 serving as the valve warm-up portion is carried out only when at an extremely low ambient temperature that may cause frost formation in the intake air amount regulating valves. When there is not an extremely low ambient temperature, heat is supplied preferentially to the oil warmer 37 serving as the transmission warm-up portion. This solves, in a desired manner, problems of decreased operating performance and hampered drivability caused in the vehicle by frost formation when there is an extremely low ambient temperature. Contrastingly, in a normal state, heat management suitable for ensuring desired fuel economy performance is carried out.

The illustrated embodiments may be modified to the forms described below.

In the second embodiment, in step S120 of the heat supply target switching routine, it is determined whether the target for the heat supply from the heat storage device 35 should be switched from the coolant circuit 30 to the oil warmer 37 depending on the temperature of the coolant water. However, such determination may be carried out using another parameter such as the time that has elapsed after starting of the engine or the passenger compartment temperature.

In the second embodiment, when there is not an extremely low ambient temperature, heat is supplied to the oil warmer 37 preferentially over the coolant circuit 30. However, even if the heat supply from the heat storage device 35 when there is an extremely low ambient temperature is controlled in a manner modified as necessary, the above-described advantages (5) to (7) can be obtained.

For the illustrated embodiments, control of the heat supply from the engine or the heat storage device has been described. However, in a case in which another heat source is usable in a period immediately after starting of the engine, the heat management device for a vehicle according to the invention may be employed as a device for controlling heat supply from the heat source to different components of the vehicle.

The invention claimed is:

1. A heat management device for a vehicle including an engine and a transmission, the heat management device comprising:

a heat source mounted in the vehicle;

a valve warm-up portion that warms up an intake air amount regulating valve of the engine using heat supplied from the heat source;

a transmission warm-up portion that warms up the transmission using the heat supplied from the heat source; and a heat management section that controls, after starting of the engine, heat supply from the heat source to supply the heat to the valve warm-up portion preferentially over the transmission warm-up portion.

2. The heat management device according to claim 1, wherein the vehicle includes a heater core for heating a passenger compartment, and the management section controls the heat supply from the heat source to supply the heat to the heater core preferentially over the transmission warm-up portion.

3. The heat management device according to claim 2, wherein, after the engine is started, the management section controls the heat supply from the heat source in such a manner that heat supply to the valve warm-up portion and the heater core, heat supply to the heater core, and heat supply to the valve warm-up portion and the transmission warm-up portion are performed sequentially in this order.

4. The heat management device according to claim 1, wherein the management section starts the heat supply to the transmission warm-up portion on condition that warm-up of a portion that has received the heat preferentially over the transmission warm-up portion is complete.

5. The heat management device according to claim 1, wherein when there is an extremely low ambient temperature, the management section controls the heat supply from the heat source to supply the heat to the valve warm-up portion preferentially over the transmission warm-up portion, and when there is not an extremely low ambient temperature, the management section controls the heat supply from the heat source to supply the heat to the transmission warm-up portion preferentially over the valve warm-up portion.

6. The heat management device according to claim 1, wherein the heat source is the engine.

7. The heat management device according to claim 1, wherein the heat source is a heat storage device that recovers exhaust heat from the engine and stores the exhaust heat after the engine is stopped.

* * * * *